(12) United States Patent
Zwick et al.

(10) Patent No.: US 8,426,031 B2
(45) Date of Patent: Apr. 23, 2013

(54) SOFT TISSUE PRODUCT COMPRISING COTTON

(75) Inventors: Kenneth John Zwick, Neenah, WI (US); John Alexander Werner, IV, Hortonville, WI (US); Michael John Rekoske, Appleton, WI (US); Ryan Gary Ripp, New Milford, CT (US); Benjamin Joseph Kruchoski, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 13/238,762

(22) Filed: Sep. 21, 2011

(65) Prior Publication Data

US 2013/0071655 A1    Mar. 21, 2013

(51) Int. Cl.
*B32B 23/04* (2006.01)

(52) U.S. Cl.
USPC ........... 428/532; 428/533; 428/534; 428/535; 428/536

(58) Field of Classification Search .................. 428/532, 428/533, 534, 535, 536
See application file for complete search history.

(56) References Cited

U.S. PATENT DOCUMENTS

| | | | |
|---|---|---|---|
| 2,774,127 A | 12/1956 | Secrist | |
| 3,706,618 A | 12/1972 | Persson | |
| 3,862,877 A | 1/1975 | Camden | |
| 5,437,908 A | 8/1995 | Demura et al. | |
| 5,656,132 A * | 8/1997 | Farrington et al. | 162/117 |
| 5,772,845 A * | 6/1998 | Farrington et al. | 162/109 |
| 6,171,442 B1 * | 1/2001 | Farrington et al. | 162/129 |
| 6,174,412 B1 | 1/2001 | Paterson Brown et al. | |
| 6,673,203 B1 | 1/2004 | Neal et al. | |
| 6,797,114 B2 * | 9/2004 | Hu | 162/109 |
| 6,827,818 B2 * | 12/2004 | Farrington et al. | 162/123 |
| 6,849,157 B2 * | 2/2005 | Farrington et al. | 162/123 |
| 7,156,954 B2 * | 1/2007 | Farrington et al. | 162/125 |
| 7,927,457 B2 * | 4/2011 | Shannon et al. | 162/129 |
| 2003/0026953 A1 | 2/2003 | Muller | |
| 2003/0127202 A1 | 7/2003 | Reinheimer et al. | |
| 2004/0086726 A1 | 5/2004 | Moline et al. | |
| 2004/0087237 A1 | 5/2004 | Garnier et al. | |
| 2004/0112558 A1 | 6/2004 | Garnier et al. | |
| 2004/0163781 A1 | 8/2004 | Hernandez Munoa et al. | |
| 2004/0194901 A1 | 10/2004 | Hu et al. | |
| 2007/0020315 A1 | 1/2007 | Shannon et al. | |
| 2007/0232179 A1 | 10/2007 | Polat et al. | |

FOREIGN PATENT DOCUMENTS

| | | |
|---|---|---|
| EP | 1 676 956 A2 | 7/2006 |
| EP | 1 591 584 B1 | 2/2009 |
| FR | 2 920 027 A1 | 2/2009 |
| GB | 1 237 489 A | 6/1971 |
| GB | 2281212 A1 | 1/1994 |
| WO | WO 98/17864 A1 | 4/1998 |
| WO | WO01/12902 * | 2/2001 |
| WO | WO 01/12902 A1 | 2/2001 |
| WO | WO 03/97938 A1 | 11/2003 |

* cited by examiner

*Primary Examiner* — Leszek Kiliman
(74) *Attorney, Agent, or Firm* — Michael J. Sullivan (57) ABSTRACT

The disclosure provides a tissue product comprising at least one multi-layered tissue web that includes a first fibrous layer and a second fibrous layer. The first fibrous layer comprises wood fibers and the second fibrous layer comprises cotton fibers. Cotton fibers are present within the second fibrous layer in an amount from about 1 to about 25 percent by weight of the layer, in some embodiments from about 5 to about 20 percent by weight of the layer, and in some embodiments, from about 10 to about 15 percent by weight of the layer. The selective incorporation of cotton fibers in the tissue web results in a web having improved handfeel without negatively effecting strength and durability.

20 Claims, 2 Drawing Sheets

SOFT TISSUE PRODUCT COMPRISING COTTON

FIELD OF THE INVENTION

This disclosure relates to a tissue product comprising a layered tissue web having at least one layer comprising cotton fibers. It has been discovered that by adding cotton fibers to at least one layer and in particular, the middle layer of a three layered web, that a softer tissue web may be produced. In addition, by limiting the amount and layers to which cotton fibers are introduced, softness may be increased while minimizing cost and maintaining other physical characteristics of the web.

BACKGROUND

Tissue products, such as facial tissues, paper towels, bath tissues, napkins, and other similar products, are designed to include several important properties. For example, the products should have good bulk, a soft feel, and should have good strength. Unfortunately, however, when steps are taken to increase one property of the product, other characteristics of the product are often adversely affected.

To achieve the optimum product properties, tissue products are typically formed, at least in part, from pulps containing wood fibers and often a blend of hardwood and softwood fibers to achieve the desire properties. Typically when attempting to optimize softness, as is often the case with tissue products, the papermaker will select the fiber furnish based in part on the coarseness of wood fibers. Pulps having fibers with low coarseness are desirable because tissue paper made from fibers having a low coarseness can be made softer than similar tissue paper made from fibers having a high coarseness.

Fiber coarseness generally increases as fiber length and fiber surface area increase. Thus, the softness of tissue products can be improved by forming the tissue products from pulps comprising primarily short fibers, as they typically have a lower coarseness relative to long fibers. Unfortunately, tissue paper strength generally decreases as the average fiber length is reduced. Therefore, simply reducing the pulp average fiber length can result in an undesirable trade-off between product softness and product strength.

Tissue products having improved softness can also be formed from pulps comprising fibers from selected species of hardwood trees. Hardwood fibers are generally less coarse than softwood fibers. For example, those skilled in the art recognize that bleached kraft pulps made from eucalyptus contain fibers of relatively low coarseness and can be used to improve the perceived softness of tissue products. Unfortunately, because kraft pulps made from a single species such as eucalyptus are preferred by papermakers attempting to make soft, durable tissue products, they are in high demand and therefore more expensive than certain pulps which tend to comprise fibers generally having inferior coarseness properties. Examples include pulps which are derived by mechanical pulping regardless of the source species and recycled pulps which invariably contain a mixture of fiber types and species. Such blends are particularly prone to having relatively high coarseness compared to their average fiber length.

The papermaker who is able to obtain pulps having a desirable combination of fiber length and coarseness from fiber blends generally regarded as inferior with respect to average coarseness and uniformity of fiber properties may reap significant cost savings and/or product improvements. For example, the papermaker may wish to make a tissue paper of superior strength without incurring the usual degradation in softness which accompanies higher strength. Alternatively, the papermaker may wish a higher degree of paper surface bonding to reduce the release of free fibers without suffering the usual decrease in softness which accompanies greater bonding of surface fibers. As such, a need currently exists for a tissue product formed from a fiber that will improve softness without negatively affecting other important product properties, such as strength.

SUMMARY

It has now been unexpectedly discovered that the incorporation of cotton fibers, despite having relatively high coarseness and curl index, within a single layer of a multi-layered web, and particularly the middle layer of a three layered web, produces a web having improved softness without a significant deterioration in strength. The increase in softness is particularly acute when the cotton fibers are selectively incorporated into a multi-layered web in relatively small amounts, i.e., less than about 10 percent of the total dry weight of the web, and especially when incorporated in the web such that the fibers are not present on the surface of the web and are not brought into contact with a user's skin in-use.

Accordingly, the present disclosure provides, in one embodiment, a tissue web comprising a multi-layered tissue web that includes a first fibrous layer and a second fibrous layer. The first fibrous layer comprises wood fibers and the second fibrous layer comprises pulp and cotton fibers. Cotton fibers are present within the second fibrous layer in an amount from about 1 to about 25 percent by weight of the layer, in some embodiments from about 5 to about 20 percent by weight of the layer, and in some embodiments, from about 10 to about 15 percent by weight of the layer. If desired, the cotton fibers may have a length less than about 3 mm, such as from about 1 to about 2 mm.

In other embodiments the present disclosure provides a through-air dried tissue web comprising a first fibrous layer consisting essentially of hardwood fibers and a second fibrous layer comprising softwood and cotton fibers, wherein the amount of cotton fibers in the second fibrous layers comprises from about 1 to about 15 percent, by weight of the second layer.

In still other embodiments the present disclosure provides a multi-layered tissue web comprising two or more fibrous layers including a first fibrous layer and a second fibrous layer, wherein a greater weight percent of cotton fiber is present in the second fibrous layer than in the fibrous first layer. In particular embodiments the first fibrous layer comprises a hardwood fiber, preferably Eucalyptus fiber, and the second layer comprises a softwood fiber, preferably Northern Softwood Kraft fiber and cotton fiber, wherein the second fibrous layer comprises less than about 20 percent by weight of cotton fiber.

In still other embodiments the present disclosure provides a multi-ply tissue product comprising at least a first and a second ply, wherein at least one of the plies comprises a first and a second layer, wherein the first layer comprises wood fibers and the second fibrous layer comprises cotton fibers, wherein the amount of cotton fibers is from about 1 to about 20 percent, by weight of the second layer.

DEFINITIONS

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As used herein, the term "average fiber length" refers to a weighted average length of wood and cotton fibers determined utilizing a Kajaani fiber analyzer model No. FS-100 available from Kajaani Oy Electronics, Kajaani, Finland. According to the test procedure, a pulp sample is treated with a macerating liquid to ensure that no fiber bundles or shives are present. Each pulp sample is disintegrated into hot water and diluted to an approximately 0.001 percent solution. Individual test samples are drawn in approximately 50 to 100 ml portions from the dilute solution when tested using the standard Kajaani fiber analysis test procedure. The weighted average fiber length may be expressed by the following equation:

$$\sum_{x_i=0}^{k} (x_i \times n_i)/n$$

where k=maximum fiber length
$x_i$=fiber length
$n_i$=number of fibers having length $x_i$
n=total number of fibers measured.

"Curl" or "curl index" of a fiber is the measure of fractional shortening of a fiber due to kinks, twists, and/or bends in the fiber. For the purposes of this invention, a fiber's curl value is measured in terms of a two-dimensional plane, determined by viewing the fiber in a two-dimensional plane. To determine the curl index of a fiber, the projected length of a fiber as the longest dimension of a two-dimensional rectangle encompassing the fiber (I), and the actual length of the fiber (L), are both measured. An image analysis method may be used to measure "L" and "I" using a Kajaani FS300 Analyzer according to ISO 16065-1. The curl value of a fiber can then be calculated from the following equation: Curl index=(L/1)−1.

As used herein, the term "log odds" refers to the natural logarithm of the preference ratio of one product versus another.

As used herein, the term "Stiffness Index" refers to the quotient of the geometric mean tensile slope, defined as the square root of the product of the MD and CD tensile slopes, divided by the geometric mean tensile strength, multiplied by 1,000.

$$\text{Stiffness Index} = \frac{\sqrt{MD \text{ Tensile Slope} \times CD \text{ Tensile Slope}}}{GMT} \times 1,000$$

As used herein, the term "TS7 Softness Value" refers to the amplitude of the peak arising between 6 and 7 kHZ, measured using the EMTEC Tissue Softness Analyzer ("TSA") (Emtec Electronic GmbH, Leipzig, Germany) as described below. TS7 Softness Value and is expressed as dB V^2 rms. Tissue webs and products produced according to the present disclosure generally have TS7 Softness Values less than about 10 dB V^2 rms, such as from about 8.5 to about 9.5 dB V^2 rms, and more preferably from about 9 to about 9.5 dB V^2 rms.

As used herein, the term "second cut cotton linters" means fibers removed from cotton seeds during a second passage of the cotton seeds through a delinting saw of a conventional linter machine, while the term "third cut cotton linters" means fiber removed from cotton seeds during a third passage of the cotton seeds through such a delinting saw.

As used herein, a "tissue product" generally refers to various paper products, such as facial tissue, bath tissue, paper towels, napkins, and the like. Normally, the basis weight of a tissue product of the present invention is less than about 80 grams per square meter (gsm), in some embodiments less than about 60 gsm, and in some embodiments, between about 10 to about 60 gsm.

As used herein, the term "layer" refers to a plurality of strata of fibers, chemical treatments, or the like within a ply.

As used herein, the terms "multi-layered tissue web", "multi-layered tissue web," "multi-layered web," "multi-layered paper sheet," and "multi-layered paper product" generally refer to sheets of paper prepared from two or more layers of aqueous papermaking furnish which are preferably comprised of different fiber types. The layers are preferably formed from the deposition of separate streams of dilute fiber slurries, upon one or more endless foraminous screens. If the individual layers are initially formed on separate foraminous screens, the layers are subsequently combined (while wet) to form a layered composite web.

The term "ply" refers to a discrete product element. Individual plies may be arranged in juxtaposition to each other. The term may refer to a plurality of web-like components such as in a multi-ply facial tissue, bath tissue, paper towel, wipe, or napkin.

DETAILED DESCRIPTION

In general, the present disclosure relates to a tissue product containing a multi-layered tissue web that has at least one layer formed from a blend of wood fibers and cotton fibers. It has been discovered that by combining pulp and cotton fibers in at least one layer and in particular, the middle layer of a three layered web, that a softer product may be produced. In addition, by limiting the amount and layers to which cotton fibers are introduced softness may be increased while minimizing cost and maintaining other physical characteristics.

Table 1 below shows a comparison of fiber morphology for a hardwood fiber (Eucalyptus pulp fiber, Aracruz Cellulose, Brazil), a softwood fiber (NSWK pulp fiber, Northern Pulp, Canada) and two different cotton fibers (282 RS, Southern Cellulose Products, Chattanooga, Tenn. and Archer Daniels Midland, Decatur, Ill.).

TABLE 1

| Fiber Type | Average Fiber Length (mm) | Curl Index | Coarseness (mg/100 m) |
| --- | --- | --- | --- |
| Cotton Linter Pulp | 1.37 | 0.19 | 18.2 |
| Cotton Linter Pulp | 1.44 | 0.17 | 16.9 |
| NSWK Pulp Fiber | 2.15 | 0.11 | 13.7 |
| Eucalyptus Pulp Fiber | 0.65 | 0.086 | 6.6 |

As is evident from Table 1, cotton fibers are greater in length than Eucalyptus fibers, but shorter than NSWK fibers. However, cotton fibers tend to be coarser than both softwood and hardwood fibers and have a higher curl index.

Unexpectedly the inclusion of cotton fibers within a single layer of a multi-layered web, and particularly the middle layer of a three layered web, produces a web having improved softness without a significant deterioration in strength. The result is unexpected provided cotton fiber morphology, namely fiber length, coarseness and curl. Typically fibers having morphology similar to cotton would be expected to have a negative effect on softness and strength. For example, pulps having a high curl index, which is indicative of the curve of the fiber, tend to produce tissue webs having poor tensile and burst strength. Similarly, pulps having high coarseness tend to produce tissue webs having reduced softness.

Although based upon fiber morphology, cotton fibers do not appear to be a suitable replacement for wood fibers, and particularly softwood fibers that customarily constitute a large percentage of the center layer of a multi-layered tissue web, it has now been discovered that by selectively incorporating cotton fibers into a multi-layered web in relatively small amounts, i.e., less than about 10 percent of the total dry weight of the web, these negative effects may be minimized. At the same time handfeel of the web may be improved without a degradation of strength. Even more surprising is that the greatest improvement in handfeel is achieved when the cotton is incorporated in the inner-layer of a multi-layered web and therefore is not brought into contact with a user's skin in-use.

Accordingly, the tissue web of the present disclosure contains at least one multi-layered tissue web. Preferably the web comprises three layers where cotton fibers are only found in the middle layer. However, it should be understood that the tissue product can include any number of plies or layers and can be made from various types of pulp and cotton fibers. The tissue webs may be incorporated into tissue products that may be either single or multi-ply, where one or more of the plies may be formed by a multi-layered tissue web having cotton selectively incorporated in one of its layers.

Regardless of the exact construction of the tissue product, at least one layer of a multi-layered tissue web incorporated into the tissue product is formed with a blend of wood fibers and cotton fibers. The wood fibers may include fibers formed by a variety of pulping processes, such as kraft pulp, sulfite pulp, thermomechanical pulp, etc. Further, the wood fibers may have be any high-average fiber length wood pulp, low-average fiber length wood pulp, or mixtures of the same. One example of suitable high-average length wood pulp fibers include softwood fibers such as, but not limited to, northern softwood, southern softwood, redwood, red cedar, hemlock, pine (e.g., southern pines), spruce (e.g., black spruce), combinations thereof, and the like. One example of suitable low-average length wood fibers include hardwood fibers, such as, but not limited to, eucalyptus, maple, birch, aspen, and the like, can also be used. In certain instances, eucalyptus fibers may be particularly desired to increase the softness of the web. Eucalyptus fibers can also enhance the brightness, increase the opacity, and change the pore structure of the web to increase its wicking ability. Moreover, if desired, secondary fibers obtained from recycled materials may be used, such as fiber pulp from sources such as, for example, newsprint, reclaimed paperboard, and office waste.

In addition, cotton fibers are also utilized in one or more layers of the multi-layered tissue web to help increase softness in the resulting tissue product. In one particular embodiment, the cotton fibers are cotton linter fibers. Preferably the cotton fibers comprise second cut cotton linters from America or Mexico or blends of second and third cut Asian cotton linters. When blends of second and third cut Asian cotton linters are employed, it is noted that blend ratios ranging from about 1:4 to about 1:1 (i.e., from about 20 to about 50 percent by weight second cuts and from about 80 to about 50 percent by weight third cuts) are preferred.

Blends of cotton fibers may be selected to achieve specific sheet properties. For example, longer fibers from long second cut cotton linters and mill runs may be used to impart strength. Moreover, shorter fibers, such as short second cuts, third cuts or hull fiber may be used to fill tissue sheet voids and thereby increase the opacity of the resulting sheet. In a preferred embodiment, from about 48 to about 72 percent by weight of longer fibers from American second cut cotton linters and from about 38 to about 52 percent by weight of shorter fibers from Asia are used in conjunction with the raw cotton linter fibers described hereinabove.

In certain embodiments, it may be desirable to have particular combinations of cotton and wood fibers within a given layer to provide desired characteristics. For example, it may be desirable to have fibers of certain lengths, coarseness, curl or other characteristics combined in certain layers or separate from each other. Individually, the fibers may have certain desired characteristics. For example, in certain embodiments, it may be desirable for the cotton fibers to have an average fiber length less than about 5 mm, such as from about 1 to about 5 mm, and more preferably from about 1 to about 3 mm and still more preferably from about 1.5 to about 2 mm.

It may also be desirable for any given layer to be formed from fibers having differing coarseness. Preferably the coarseness of the cotton fibers in the cotton containing layer have an average coarseness measurement of from about 10 mg/100 ml to about 25 mg/100 ml, more preferably from about 12 mg/100 ml to about 20 mg/100 ml and still more preferably from about 15 mg/100 ml to about 18 mg/100 ml.

It may also be desirable for any given layer to be formed from fibers having differing curl indexes. Preferably the curl index of the cotton fibers in the cotton containing layer have an average fiber curl index, as described above, of at least about 0.15, such as from about 0.15 to about 0.25, and more preferably from about 0.15 to about 0.20. Surprisingly, tissue webs prepared according to the present disclosure may possess cotton fibers having a high curl index, i.e., greater than about 0.15, without negatively effecting tensile strength.

The amount of cotton fibers present within a layer of the multi-layered tissue web may generally vary depending on the desired properties of the tissue product. For instance, the use of a large amount of cotton fibers typically results in a tissue product with lower strength and a more abrasive surface. Additionally, the use of large amounts of cotton fibers may negatively impact sheet formation and is relatively costly. Likewise, the use of very low amounts of cotton fibers, i.e., less than about 1 percent of the total weight of the web, typically results in a tissue product having little discernable difference compared to tissue products manufactured without cotton. Thus, in certain embodiments, tissue webs prepared according to the present disclosure comprise cotton fibers in an amount from about 1 to about 25 percent by dry weight of the web, preferably from about from about 1 to about 20 percent, more preferably from about 1 to about 10 percent.

The properties of the resulting tissue product may be varied by selecting particular layer(s) for incorporation of the cotton fibers. It has now been discovered that the greatest increase in softness without adverse effects on tensile strength or other sheet properties is achieved by incorporating the cotton fibers into a softwood fiber inner layer of a tissue product. Further, if desired, the increase in cost often encountered with cotton fibers can be reduced by restricting application of the cotton fibers to only a single layer of the web. For instance, in one embodiment, a three-layered tissue web can be formed in which the inner layer contains wood fibers and cotton fibers, while the outer layers are substantially free of cotton fibers. It should be understood that, when referring to a layer that is substantially free of cotton fibers, minuscule amounts of the fibers may be present therein. However, such small amounts often arise from the cotton fibers applied to an adjacent layer, and do not typically substantially affect the softness or other physical characteristics of the tissue product.

Accordingly, in a preferred embodiment the tissue web is a multi-layered web comprising a first fibrous layer and a second fibrous layer, wherein the first fibrous layer comprises wood fibers and the second fibrous layer comprises wood and cotton fibers, wherein the amount of cotton fibers is from about 1 to about 20 percent, by weight of the second layer. More preferably the second fibrous layer comprises wood and cotton fibers, wherein the amount of cotton fibers is from about 3 to about 15 percent, by weight of the second layer and still more preferably from about 5 to about 10 percent, by weight of the second layer.

By combining cotton fibers in a tissue web in this manner, the disclosure provides a web that has surprising characteristics. For example, tissue webs of the present invention may provide benefits over currently available webs in the areas of, for example, softness and Fine Crepe Structure, and can provide manufacturing benefits by increasing output rates due to a reduced need to refine cotton fibers to get the same properties in the resulting web. Accordingly, tissue webs having selectively incorporated cotton fibers may have a Fine Crepe Structure less than about 20% COV @ 0.28-0.55 mm, such as from about 18 to about 20% COV @ 0.28-0.55 mm.

In other embodiments, webs prepared according to the present disclosure have improved surface properties including, for example, Stiffness Index. In certain embodiments webs comprising less than about 10 percent cotton fibers, by weight of the web, have a Stiffness Index of less than about 14, such as from about 13 to about 14, and more preferably from about 13.5 to about 13.8.

In yet other embodiments, webs prepared according to the present disclosure have improved softness including, for example, reduced TS7 Softness Values relative to webs that do not contain cotton. In certain embodiments webs comprising less than about 10 percent cotton fibers, by weight of the web, have a TS7 Softness Value of less than about 10 dB V^2 rms, such as from about 8.5 to about 9.5 dB V^2 rms, and more preferably from about 9 to about 9.5 dB V^2 rms.

Further, tissue webs having selectively incorporated cotton fibers, compared to an identically prepared tissue product without cotton fibers, display improved handfeel at equivalent strength levels. Surprisingly this benefit resulted from the use of a small percent by weight, such as less than about 10 percent by weight of the web, and was particularly prominent when the cotton was incorporated into the inner layer of the web rather than in the outer layer.

As indicated above, the cotton fibers are generally blended with wood fibers and incorporated into one or more layers of a multi-layered tissue web. For instance, in one embodiment of the present invention includes the formation of a single ply tissue product. In this embodiment, the single ply is a tissue web having three layers. The outer layers comprise wood fibers, such as described above. The inner layer comprises a blend of cotton and wood fibers. For example, in one embodiment, the inner layer comprises a blend of softwood fibers and cotton fibers, such that the total weight of softwood fibers in the layer ranges from about 85 to about 95 percent and the total weight of cotton fiber ranges from about 15 to about 5 percent. In a particularly preferred embodiment the inner layer comprises from about 5 to about 7 percent cotton fibers and from about 95 to about 97 percent softwood fibers.

In other embodiment the present disclosure provides a two-ply tissue product. In this embodiment, the tissue product contains an upper multi-layered tissue web and a lower multi-layered tissue web that are plied together using well-known techniques. In a particularly preferred embodiment the upper web contains three layers, a top layer, a middle layer and a bottom layer. For example, in one embodiment, the middle layer contains a blend of about 85 percent softwood fibers and about 15 percent cotton fibers, such that the total fiber content of the layer represents about 33 percent by weight of the web. In addition, the top layer contains about 100 percent hardwood fibers and represents about 32 percent by weight of the web and the bottom layer includes about 100 percent hardwood fibers and represents 35 percent by weight of the web. On the other hand, the lower tissue web contains a layer of hardwood fibers, a layer of softwood and cotton fibers, and a layer of hardwood fibers, constituting about 33 percent, about 35 percent, and about 32 percent of the web, respectively. Similar to the upper web, the middle layer comprises about 15 percent cotton fibers and 85 percent softwood fibers.

Other arrangements and combinations of fibers are contemplated, so long as the tissue product comprises at least one multi-layered web, wherein at least one layer of the multi-layered web comprises a mixture of cotton and wood fibers.

If desired, various chemical compositions may be applied to one or more layers of the multi-layered tissue web to further enhance softness and/or reduce the generation of lint or slough. For example, in some embodiments, a wet strength agent can be utilized, to further increase the strength of the tissue product. As used herein, a "wet strength agent" is any material that, when added to wood fibers can provide a resulting web or sheet with a wet geometric tensile strength to dry geometric tensile strength ratio in excess of about 0.1. Typically these materials are termed either "permanent" wet strength agents or "temporary" wet strength agents. As is well known in the art, temporary and permanent wet strength agents may also sometimes function as dry strength agents to enhance the strength of the tissue product when dry.

Wet strength agents may be applied in various amounts, depending on the desired characteristics of the web. For instance, in some embodiments, the total amount of wet strength agents added can be between about 1 to about 60 pounds per ton (lb/T), in some embodiments, between about 5 to about 30 lb/T, and in some embodiments, between about 7 to about 13 lb/T of the dry weight of fibrous material. The wet strength agents can be incorporated into any layer of the multi-layered tissue web.

A chemical debonder can also be applied to soften the web. Specifically, a chemical debonder can reduce the amount of hydrogen bonds within one or more layers of the web, which results in a softer product. Depending on the desired characteristics of the resulting tissue product, the debonder can be utilized in varying amounts. For example, in some embodiments, the debonder can be applied in an amount in an amount between about 1 to about 30 lb/T, in some embodiments between about 3 to about 20 lb/T, and in some embodiments, between about 6 to about 15 lb/T of the dry weight of fibrous material. The debonder can be incorporated into any layer of the multi-layered tissue web.

Any material that can be applied to fibers and that is capable of enhancing the soft feel of a web by disrupting hydrogen bonding can generally be used as a debonder in the present invention. In particular, as stated above, it is typically desired that the debonder possess a cationic charge for forming an electrostatic bond with anionic groups present on the pulp. Some examples of suitable cationic debonders can include, but are not limited to, quaternary ammonium compounds, imidazolinium compounds, bis-imidazolinium compounds, diquaternary ammonium compounds, polyquaternary ammonium compounds, ester-functional quaternary ammonium compounds (e.g., quaternized fatty acid trialkanolamine ester salts), phospholipid derivatives, polydimethylsiloxanes and related cationic and non-ionic silicone compounds, fatty and carboxylic acid derivatives, mono- and polysaccharide derivatives, polyhydroxy hydrocarbons, etc. For instance, some suitable debonders are described in U.S. Pat. Nos. 5,716,498, 5,730,839, 6,211,139, 5,543,067, and WO/0021918, all of which are incorporated herein in a manner consistent with the present disclosure.

Still other suitable debonders are disclosed in U.S. Pat. Nos. 5,529,665 to Kaun and 5,558,873 to Funk, et al., both of which are incorporated herein in a manner consistent with the present disclosure. In particular, Kaun discloses the use of various cationic silicone compositions as softening agents.

The multi-layered web can generally be formed according to a variety of papermaking processes known in the art. In fact, any process capable of making a tissue web can be utilized in the present invention. For example, a papermaking process of the present invention can utilize wet-pressing, creping, through-air drying, creped through-air drying, uncreped through-air drying, single recreping, double recreping, calendering, embossing, air laying, as well as other steps in processing the tissue web.

In some embodiments, in addition to the use of various chemical treatments, such as described above, the papermaking process itself can also be selectively varied to achieve a web with certain properties. For instance, a papermaking process can be utilized to form a multi-layered tissue web, such as described and disclosed in U.S. Pat. Nos. 5,129,988 to Farrington, Jr.; 5,494,554 to Edwards, et al.; and 5,529,665 to Kaun, which are incorporated herein in a manner consistent with the present disclosure.

In this regard, various embodiments of a method for forming a multi-layered tissue web will now be described in more detail. For example, wet-pressed tissue webs may be prepared using methods known in the art and commonly referred to as couch forming, wherein two wet web layers are independently formed and thereafter combined into a unitary web. To form the first web layer, fibers (e.g., pulp and/or cotton fibers) are prepared in a manner well known in the papermaking arts and delivered to the first stock chest, in which the fiber is kept in an aqueous suspension. A stock pump supplies the required amount of suspension to the suction side of the fan pump. If desired, a metering pump can supply an additive (e.g., latex, reactive composition, etc.) into the fiber suspension. Additional dilution water also is mixed with the fiber suspension.

The entire mixture of fibers is then pressurized and delivered to a headbox. The aqueous suspension leaves the headbox and is deposited on an endless papermaking fabric over the suction box. The suction box is under a vacuum that draws water out of the suspension, thus forming the first layer. In this example, the stock issuing from the headbox 6 would be referred to as the "air side" layer, that layer eventually being positioned away from the dryer surface during drying. In some embodiments, it may be desired for a layer containing the synthetic and pulp fiber blend to be formed as the "air side" layer. As will be described in more detail below, this may facilitate the ability of the cotton fibers to remain below their melting point during drying.

The forming fabric can be any forming fabric, such as fabrics having a fiber support index of about 150 or greater. Some suitable forming fabrics include, but are not limited to, single layer fabrics, such as the Appleton Wire 94M available from Albany International Corporation, Appleton Wire Division, Menasha, Wis.; double layer fabrics, such as the Asten 866 available from Asten Group, Appleton, Wis.; and triple layer fabrics, such as the Lindsay 3080, available from Lindsay Wire, Florence, Miss.

The consistency of the aqueous suspension of papermaking fibers leaving the headbox can be from about 0.05 to about 2 percent, and in one embodiment, about 0.2 percent. The first headbox can be a layered headbox with two or more layering chambers which delivers a stratified first wet web layer, or it can be a monolayered headbox which delivers a blended or homogeneous first wet web layer.

To form the second web layer, fibers (e.g., pulp and/or cotton fibers) are prepared in a manner well known in the papermaking arts and delivered to the second stock chest, in which the fiber is kept in an aqueous suspension. A stock pump supplies the required amount of suspension to the suction side of the fan pump. A metering pump can supply additives (e.g., latex, reactive composition, etc.) into the fiber suspension as described above. Additional dilution water is also mixed with the fiber suspension. The entire mixture is then pressurized and delivered to a headbox. The aqueous suspension leaves the headbox 16 and is deposited onto an endless papermaking fabric over the suction box. The suction box is under vacuum which draws water out of the suspension, thus forming the second wet web. In this example, the stock issuing from the headbox is referred to as the "dryer side" layer as that layer will be in eventual contact with the dryer surface. In some embodiments, it may be desired for a layer containing the synthetic and pulp fiber blend to be formed as the "dryer side" layer. As will be described in more detail below, this may facilitate the ability of the cotton fibers to remain above their melting point during drying. Suitable forming fabrics for the forming fabric of the second headbox include those forming fabrics previously mentioned with respect to the first headbox forming fabric.

After initial formation of the first and second wet web layers, the two web layers are brought together in contacting relationship (couched) while at a consistency of from about 10 to about 30 percent. Whatever consistency is selected, it is typically desired that the consistencies of the two wet webs be substantially the same. Couching is achieved by bringing the first wet web layer into contact with the second wet web layer at roll.

After the consolidated web has been transferred to the felt at the vacuum box, dewatering, drying and creping of the consolidated web is achieved in the conventional manner. More specifically, the couched web is further dewatered and transferred to a dryer (e.g., Yankee dryer) using a pressure roll, which serves to express water from the web, which is absorbed by the felt, and causes the web to adhere to the surface of the dryer. The web is then dried, optionally creped and wound into a roll for subsequent converting into the final creped product.

Tissue products according to the present disclosure may also be manufactured using a multi-layered headbox, a forming fabric, a forming roll, a papermaking felt, a press roll, a Yankee dryer, and a creping blade. In operation, a layered headbox continuously deposits a layered stock jet between the forming fabric and the felt, which is partially wrapped around the forming roll. Water is removed from the aqueous stock suspension through the forming fabric by centrifugal force as the newly-formed web traverses the arc of the forming roll. As the forming fabric and felt separate, the wet web stays with the felt and is transported to the Yankee dryer.

At the Yankee dryer, the creping chemicals are continuously applied on top of the existing adhesive in the form of an aqueous solution. The solution is applied by any convenient means, such as using a spray boom that evenly sprays the surface of the dryer with the creping adhesive solution. The point of application on the surface of the dryer is immediately following the creping doctor blade, permitting sufficient time for the spreading and drying of the film of fresh adhesive.

In some instances, various chemical compositions (e.g., debonding agents) may be applied to the web as it is being dried, such as through the use of the spray boom. For example, the spray boom can apply the additives to the surface of the drum separately and/or in combination with the creping adhesives such that such additives are applied to an outer layer of the web as it passes over the drum. In some embodiments, the point of application on the surface of the dryer is the point immediately following the creping blade, thereby permitting sufficient time for the spreading and drying of the film of fresh adhesive before contacting the web in the press roll nip. Methods and techniques for applying an additive to a dryer drum are described in more detail in U.S. Pat. Nos. 5,853,539 to Smith, et al. and 5,993,602 to Smith, et al., which are incorporated herein in a manner consistent with the present disclosure.

The wet web is applied to the surface of the dryer by a press roll with an application force of, in one embodiment, about 200 pounds per square inch (psi). Following the pressing or dewatering step, the consistency of the web is typically at or above about 30 percent. Sufficient Yankee dryer steam power and hood drying capability are applied to this web to reach a final consistency of about 95 percent or greater, and particularly 97 percent or greater. The sheet or web temperature immediately preceding the creping blade, as measured, for example, by an infrared temperature sensor, is typically about 235° F. or higher. Besides using a Yankee dryer, it should also be understood that other drying methods, such as microwave or infrared heating methods, may be used in the present invention, either alone or in conjunction with a Yankee dryer.

The web can also be dried using non-compressive drying techniques, such as through-air drying. A through-air dryer accomplishes the removal of moisture from the web by passing air through the web without applying any mechanical pressure. Through-air drying can increase the bulk and softness of the web. Examples of such a technique are disclosed in U.S. Pat. Nos. 5,048,589 to Cook, et al.; 5,399,412 to Sudall, et al.; 5,510,001 to Hermans, et al.; 5,591,309 to Rugowski, et al.; and 6,017,417 to Wendt, et al., which are incorporated herein in a manner consistent with the present disclosure.

Test Methods

Tensile Strength

Tensile strength was reported as grams per 3 inches of a sample. MD and CD tensile strengths were determined using a MTS/Sintech tensile/tester (available from the MTS Systems Corp., Eden Prairie, Minn.). The geometric mean tensile strength (GMT) was calculated as the square root of the product of MD tensile strength and CD tensile strength. Tissue samples measuring 3 inches wide were cut in both the machine and cross-machine directions. For each test, a sample strip was placed in the jaws of the tester, set at a 4 inch gauge length for facial tissue and 2 inch gauge length for bath tissue. The crosshead speed during the test was 10 in./minute. The tester was connected with a computer loaded with data acquisition system; e.g., MTS TestWork for windows software. Readings were taken directly from a computer screen readout at the point of rupture to obtain the tensile strength of an individual sample.

Crepe Structure Analysis/Fine Crepe Structure Test

To determine the structure of the tissue sheet after creping the crepe structure was characterized using tissue images and the STFI mottling program as described in US Publication No. 2010/0155004. The STFI mottling program has been written to run with Matlab computer software for computation and programming A grayscale image is uploaded to the program where an image of the tissue in question had been generated under controlled, low-angle lighting conditions with a video camera, frame grabber and an image acquisition algorithm.

A Leica DFX-300 camera (Leica Microsystems Ltd, Heerbrugg, Switzerland) 420 is mounted on a Polaroid MP-4 Land Camera (Polaroid Resource Center, Cambridge, Mass.) standard support 422. The support is attached to a Kreonite macro-viewer available from Kreonite, Inc., having an office in Wichita, Kans. An auto-stage, DCI Model HM-1212, is placed on the upper surface of the Kreonite macro-viewer and the sample mounting apparatus was placed atop the auto-stage. The auto-stage is a motorized apparatus known to those skilled in the analytical arts which was purchased from Design Components Incorporated (DCI), having an office in Franklin, Mass. The auto stage is used to move the sample in order to obtain 15 separate and distinct, non-overlapping images from the specimen. The sample mounting apparatus 424 is placed on the auto macro-stage (DCI 12×12 inch) of an image analysis system controlled by Leica Microsystems QWIN Pro software, under the optical axis of a 60-mm AF Micro Nikkor lens (Nikon Corp., Japan) fitted with a 20-mm extension tube. The lens focus is adjusted to provide the maximum magnification and the camera position on the Polaroid MP-4 support is adjusted to provide optimum focus of the tissue edge. The sample is illuminated from beneath the auto-stage using a Chroma Pro 45 (Circle 2, Inc., Tempe, Ariz.). The Chroma Pro settings are such that the light is 'white' and not filtered in any way to bias the light's spectral output. The Chroma Pro may be connected to a POWERSTAT Variable Auto-transformer, type 3PN117C, which may be purchased from Superior Electric, Co. having an office in Bristol, Conn. The auto-transformer is used to adjust the Chroma Pro's illumination level. The resulting image has a pixel resolution of 1024×1024 and represents a 12.5×12.5 mm field of view.

The image analysis system used to acquire images and perform the PR/EL measurements may be a QWIN Pro available from Leica Microsystems, having an office in Heerbrugg, Switzerland. The system is controlled and run by Version 3.2.1 of the QWIN Pro software. The image analysis algorithm 'FOE3a' is used to acquire and process gray-scale monochrome images using Quantimet User Interactive Programming System (QUIPS) language. Alternatively, the FOE3a program could be used with newer QWIN Pro platforms which run newer versions of the software (e.g. QWIN Pro Version 3.5.1). The custom image analysis program was previously described in US Publication No. 2010/0155004.

The STFI mottling software analyzes the grayscale variation of the image in both the MD and CD directions by using FFT (Fast Fourier Transform). The FFT is used to develop gray-scale images at different wavelength ranges based on the frequency information present within the FFT. The gray-scale coefficient-of-variation (% COV) is then calculated from each of the images (e.g. inverse FFT's) corresponding to the wavelengths which were pre-determined by the STFI software. Since these images are generated with low-angle lighting, the tissue surface structure is shown as areas of light and dark, due to shadowing, and consequently the grayscale variation can be related to the tissue surface structure.

Tissue Softness Analyzer

Sample softness was analyzed using an EMTEC Tissue Softness Analyzer ("TSA") (Emtec Electronic GmbH, Leipzig, Germany). The TSA comprises a rotor with vertical blades which rotate on the test piece applying a defined contact pressure. Contact between the vertical blades and the test piece creates vibrations, which are sensed by a vibration sensor. The sensor then transmits a signal to a PC for processing and display. The signal is displayed as a frequency spectrum. The frequency analysis in the range of approximately 200 to 1000 Hz represents the surface smoothness or texture of the test piece. A high amplitude peak correlates to a rougher surface. A further peak in the frequency range between 6 and 7 kHZ represents the softness of the test piece. The peak in the frequency range between 6 and 7 kHZ is herein referred to as the TS7 Softness Value and is expressed as dB V^2 rms. The lower the amplitude of the peak occurring between 6 and 7 kHZ, the softer the test piece.

Test pieces may be either round with a diameter of 112.8 mm or square with dimensions of 100 mm by 100 mm All test pieces are allowed to equilibrate at TAPPI standard temperature and humidity conditions for at least 24-hours prior to completing the TSA testing. Only one ply of tissue is tested. Multi-ply samples are separated into individual plies for testing. The test piece is placed in the TSA with the softer (dryer or Yankee) side of the test piece facing upward. Once the test piece is secured, measurement of the TS7 Softness Value is started via the PC. The PC records, process and stores all of the data according to standard TSA protocol. After the completion of the measurement the measured and calculated results are displayed. The reported TS7 Softness Value is the average of 5 replicates, each one with a new test piece.

In-Hand Ranking Test for Tactile Properties (IHR Test):

The In-Hand Ranking Test (IHR) is a basic assessment of in-hand feel of fibrous webs and assesses attributes such as softness and stiffness. It can provide a measure of generalizability to the consumer population.

The softness test involves evaluating the velvety, silky or fuzzy feel of a tissue sample when rubbed between the thumb and fingers. The stiffness test involves gathering a flat sample into one's hand and moving the sample around in the palm of the hand by drawing the fingers toward the palm and evaluating the amount of pointed, rigid or cracked edges or peaks felt.

Rank data generated for each sample code by the panel are analyzed using a proportional hazards regression model. This model assumes computationally that the panelist proceeds through the ranking procedure from most of the attribute being assessed to the least of the assessed attribute. The softness and stiffness test results are presented as log odds values. The log odds are the natural logarithm of the risk ratios that are estimated for each code from the proportional hazards regression model. Larger log odds indicate the attribute of interest is perceived with greater intensity.

The IHR is employed to obtain a holistic assessment of softness and stiffness, or to determine if product differences are humanly perceivable. This panel is trained to provide assessments more accurately than an average untrained consumer might provide. The IHR is useful in obtaining a quick read as to whether a process change is humanly detectable and/or affects the softness or stiffness perception, as compared to a control.

The data from the IHR can also be presented in rank format. The data can generally be used to make relative comparisons within tests as a product's ranking is dependent upon the products it is ranked with. Across-test comparisons can be made when at least one product is tested in both tests.

EXAMPLES

The ability to form a tissue web comprising cotton with improved softness was demonstrated. Inventive sample codes were made using a wet pressed process utilizing a Crescent Former. Accordingly, 2-ply facial tissue products were produced and tested according to the same tests described in the Test Methods section. The following tissue manufacturing process was used to produce the sample codes.

Initially, northern softwood kraft (NSWK) pulp was dispersed in a pulper for 30 minutes at 4 percent consistency at about 100° F. The NSWK pulp was then transferred to a dump chest and subsequently diluted to approximately 3 percent consistency. The NSWK pulp was refined at 1.5 to 5.0 hp-days/metric ton. Two kilograms Kymene® 920A and 1 to 5 kilograms Hercobond® 1366 (Ashland, Covington, Ky.) per metric ton of wood fiber was added to the NSWK pulp prior to the headbox.

Aracruz ECF, a eucalyptus hardwood kraft (EHWK) pulp (Aracruz, Rio de Janeiro, RJ, Brazil) was dispersed in a pulper for 30 minutes at about 4 percent consistency at about 100° F. The EHWK pulp was then transferred to a dump chest and subsequently diluted to about 3 percent consistency. Two kilograms Kymene® 920A per metric ton of wood fiber was added to the EHWK pulp prior to the headbox.

Samples comprising cotton were prepared using Southern Cellulose cotton grades 177, 282R or 282RS (Southern Cellulose Products, Inc., Chattanooga, Tenn.). All cotton grades were second cut cotton linters that had been cleaned, refined and processed into pulp sheets. Cotton fibers were dispersed in a pulper for 30 minutes at about 4 percent consistency at about 100° F.

Fibers from the machine chests were pumped to the headbox at a consistency of about 0.1 percent. To form the layered web structure, wood fibers from each machine chest were sent through separate manifolds in the headbox to create a 3-layered tissue structure. Two different 3-layered tissue structures were produced. The first, noted as DFL, was a 3-layered structure wherein the weight of fiber in each layer, as a percentage of the total weight of the sheet was 44 percent EHWK, 32 percent NSWK, 24 percent EHWK. In certain instances, cotton was introduced to DFL layered sheets as a replacement for EHWK in the first layer or NSWK in the middle layer. The second layered structure, noted as RTL, comprised three layers, where the first layer comprised 44 percent EHWK, the second layer comprised 16 percent NSWK and 12 percent EHWK and the third layer comprised 16 percent NSWK and 12 percent EHWK, where each of the weight percentages are expressed as the percentage of the total weight of the sheet. For RTL layered sheets, cotton was introduced to the web as a replacement for NSWK in the middle layer. In each instance, fibers were deposited onto a felt using a Crescent Former.

The wet sheet, about 10 to 20 percent consistency, was adhered to a Yankee dryer, traveling at about 2000 fpm through a nip via a pressure roll.

The consistency of the wet sheet after the pressure roll nip (post-pressure roll consistency or PPRC) was approximately 40 percent. The wet sheet is adhered to the Yankee dryer due to the creping composition that is applied to the dryer surface. A spray boom situated underneath the Yankee dryer sprayed the creping composition which comprised a water insoluble creping chemistries provided by Dow Chemical, HYPOD™ 8510, which was applied onto the dryer surface at addition levels of about 200 mg/m².

The sheet was dried to about 98 to 99 percent consistency as it traveled on the Yankee dryer and to the creping blade. The creping blade subsequently scraped the tissue sheet and a portion of the creping composition off the Yankee dryer. The creped tissue basesheet was then wound onto a core traveling at about 1570 to about 3925 fpm (480 to 1200 mpm) into soft rolls for converting. The resulting tissue basesheet had an air-dried basis weight of about 14.2 g/m². Two soft rolls of the creped tissue were then rewound, calendared, and plied together so that both creped sides were on the outside of the 2-ply structure. Mechanical crimping on the edges of the structure held the plies together. The plied sheet was then slit on the edges to a standard width of approximately 8.5 inches and folded, and cut to facial tissue length. Tissue samples were conditioned and tested.

TABLE 2

| Sample | Layering | Cotton Fiber Type | Wt % Cotton Total Sheet | Wt % Cotton Center Layer | MDT (g/3") | MDS (%) | CDT (g/3") | CDS (%) | GMT (g/3") |
|---|---|---|---|---|---|---|---|---|---|
| 1 | DFL | 282RS | 1.6 | 5 | 1026 | 17.99 | 478 | 4.44 | 700 |
| 2 | DFL | 282RS | 4.8 | 15 | 942 | 19.47 | 457 | 4.62 | 656 |
| 3 | DFL | 282RS | 16 | 50 | 898 | 17.74 | 388 | 4.58 | 590 |
| 4 | DFL | 282RS | 6.6 | 0 | 725 | 15.36 | 349 | 4.62 | 503 |
| Control 1 | DFL | None | 0 | 0 | 1024 | 20.97 | 416 | 4.09 | 653 |
| Control 2 | DFL | None | 0 | 0 | 1425 | 22.65 | 685 | 4.83 | 988 |
| Control 3 | DFL | None | 0 | 0 | 1170 | 19.23 | 576 | 7.93 | 821 |
| Control 4 | DFL | None | 0 | 0 | 1354 | 19.85 | 665 | 6.9 | 949 |
| Control 5 | RTL | None | 0 | 0 | 1175 | 20.24 | 566 | 7.07 | 816 |
| Control 6 | RTL | None | 0 | 0 | 1263 | 21.88 | 588 | 6.65 | 862 |
| 5 | DFL | 282RS | 2.2 | 7 | 1106 | 19.4 | 504 | 7.69 | 747 |
| 6 | DFL | 282RS | 2.2 | 7 | 1145 | 19.27 | 536 | 7.38 | 783 |
| 7 | RTL | 282RS | 2.2 | 7 | 978 | 18.9 | 486 | 7.48 | 689 |
| 8 | RTL | 282RS | 2.2 | 7 | 1126 | 20.19 | 545 | 7.28 | 783 |
| 9 | DFL | 177 | 2.2 | 7 | 975 | 18.82 | 459 | 8.13 | 669 |
| 10 | DFL | 177 | 2.2 | 7 | 1082 | 22.2 | 514 | 7.49 | 746 |
| 11 | DFL | 282R | 2.2 | 7 | 986 | 19.4 | 494 | 7.16 | 698 |
| 12 | DFL | 282R | 2.2 | 7 | 1142 | 20.59 | 531 | 7.51 | 779 |

Handfeel

Samples were prepared to illustrate the effect of adding cotton on handfeel. Samples 1 through 3 were all prepared with EHWK in the outer layers and NSWK fibers and cotton fibers in the middle layer. Example 4 was prepared with EHWK and cotton fibers in the outer layer, while the inner layer comprised NSWK.

TABLE 3

| Sample Code | Cotton Type | Wt % Cotton Outer Layer | Wt % Cotton Center Layer | Cotton Total Sheet | Handfell (Softness-Sitffness) | Log Odds Softness | Log Odds Stiffness | GMT (g/3") |
|---|---|---|---|---|---|---|---|---|
| 1 | 282RS | 0 | 5 | 1.6 | 0.17 | 0.77 | 0.61 | 700 |
| 2 | 282RS | 0 | 15 | 4.8 | 0.49 | 0.58 | 0.09 | 656 |
| 3 | 282RS | 0 | 50 | 16 | −0.74 | 0.06 | 0.80 | 590 |
| 4 | 282RS | 15 | 0 | 6.6 | 1.72 | 0.61 | −1.11 | 503 |
| Control 1 | — | 0 | 0 | 0 | 0.00 | 0.00 | 0.00 | 653 |
| Control 2 | — | 0 | 0 | 0 | −3.24 | −0.17 | 3.08 | 988 |

Figure 1:
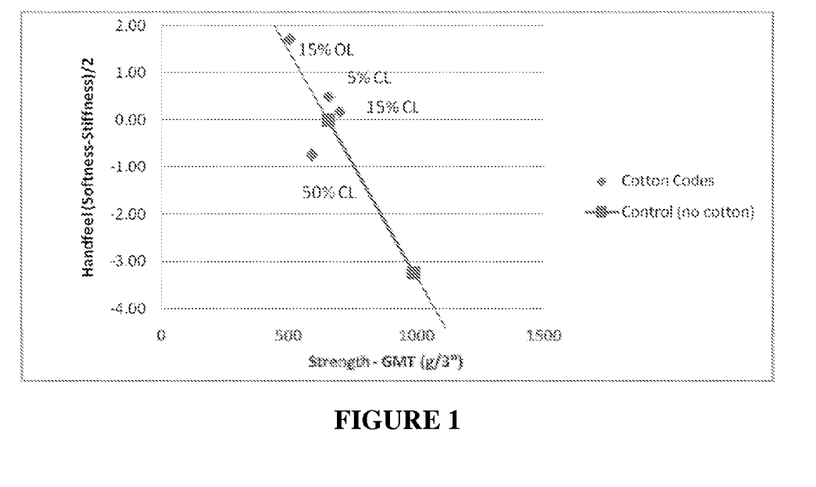
FIG. 1 illustrates a plot of IHR Handfeel versus GMT for the samples prepared as described herein.

The overall handfeel was evaluated by combining the panel softness and stiffness scores. FIG. 1 illustrates the effect of GMT on handfeel. Handfeel is known to deteriorate with strength, so it is important to compare handfeel at a given strength. The control codes with no cotton (squares) were made at two strengths. Codes prepared with 5 and 15 percent cotton by weight in the center layer provided improved handfeel over controls containing no cotton, at equivalent strengths. As can be further seen in FIG. 1, when cotton is added to the sheet in very high levels, e.g., 50 percent by weight of the center layer, the sheet becomes stiff and has a lower handfeel relative to the control. FIG. 1 also illustrates that when cotton is incorporated into the outer layer little or no improvement over the control is observed.

Figure 2:
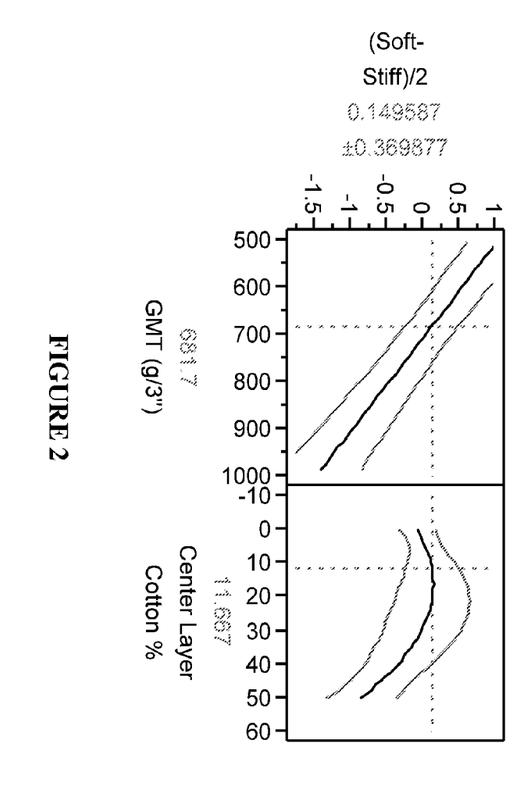
FIG. 2 illustrates a multiple linear regression of IHR Handfeel versus GMT and the percentage of cotton in the center layer of a three layered web the plot on the left illustrates the dependence of handfeel on GMT, while the plot on the right illustrates the dependence of handfeel on the percentage of cotton.

To determine the optimal level of cotton in the center layer, the handfeel data was subjected to multiple linear regression. As shown in FIG. 2, handfeel improves when the center layer comprises up to about 20 percent cotton by weight, with additions of about 7 to about 20 percent by weight providing improved handfeel relative to sheets prepared without cotton. Codes containing 15 percent cotton by weight in the center layer provided ~0.2 log odds preference increase, which is equivalent to a 55:45 preference for the sheet containing cotton in the center layer relative to a sheet without.

Tensile Strength

The effect of cotton on the strength (GMT) of the tissue web was explored by preparing samples using several different types of cotton having differing average fiber lengths at different addition levels. The effect on GMT is summarized in the Table below.

Figure 3:
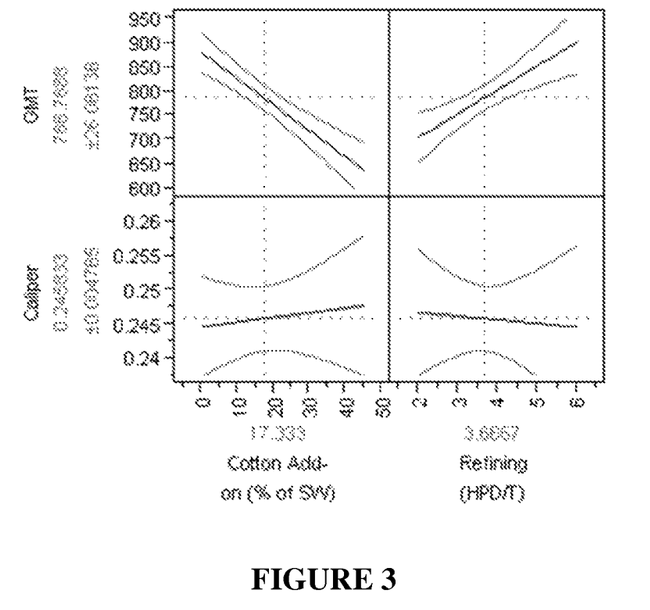
FIG. 3 illustrates the effect of cotton on GMT and shows that strength decreases approximately 50 grams per 3 inches for every 10 percent of softwood that was replaced by cotton.
Figure 4:
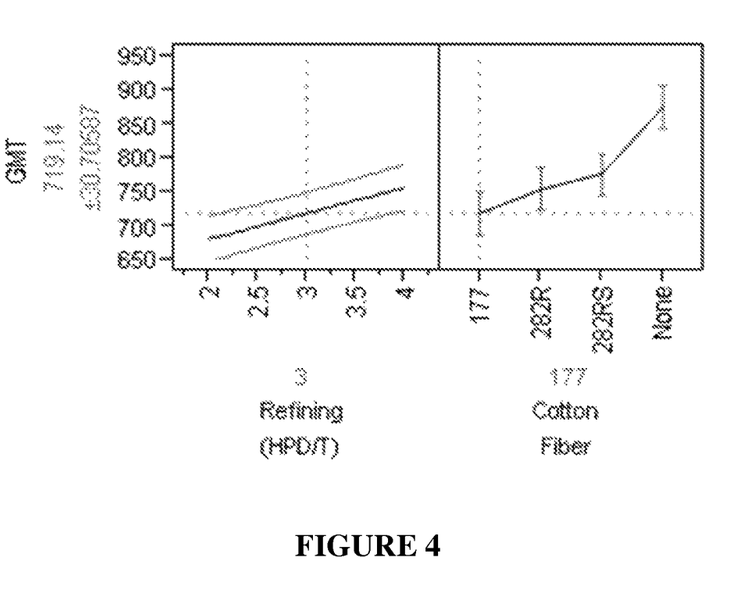
FIG. 4 illustrates the effect of cotton fiber length on GMT.

As shown above, and further illustrated in FIGS. 3 and 4, cotton had an adverse effect on GMT when added at high amounts. FIG. 3 illustrates the effect of cotton on GMT and shows that strength decreases approximately 50 grams per 3 inches for every 10 percent of softwood that was replaced by cotton. When the amount of cotton in the center layer was increased to 50 percent of the weight of the layer, the web became weak and machine runability was poor. FIG. 4 illustrates the effect of cotton fiber length on GMT. The average fiber length of the cotton fibers was about 1.5 mm for 282RS, about 1 mm for 177 and about 3 mm for 282R. As shown in FIG. 4 strength increases as fiber length is increased, however, at the longest fiber length, 3 mm for 282R, the strength actually decreased.

TS7 Softness Values

The effect of cotton fibers on the softness of the resulting web was explored by preparing samples varying the amount and layer to which cotton was added and measuring the TS7 Softness Value. The effect on the TS7 Softness Value is summarized in the Table below.

TABLE 5

| Sample | Cotton Type | Wt % Cotton Outer Layer | Wt % Cotton Center Layer | Wt % Cotton Total Sheet | TS7 Softness Value (dB V^2 rms) |
|---|---|---|---|---|---|
| 1 | 282RS | 0 | 5 | 1.6 | 9.2 |
| 2 | 282RS | 0 | 15 | 4.8 | 9.2 |
| Control 3 | — | 0 | 0 | 0 | 9.7 |
| 10 | 177 | 0 | 7 | 2.2 | 9.3 |
| 12 | 282R | 0 | 7 | 2.2 | 9.2 |

TABLE 4

| Sample | Cotton Type | Wt % Cotton Outer Layer | Wt % Cotton Center Layer | Wt % Cotton Total Sheet | GMT (g/3") | MD Stretch (%) |
|---|---|---|---|---|---|---|
| 1 | 282RS | 0 | 5 | 1.6 | 700 | 18.0 |
| 2 | 282RS | 0 | 15 | 4.8 | 656 | 19.5 |
| 3 | 282RS | 0 | 50 | 16 | 590 | 17.7 |
| Control 3 | — | 0 | 0 | 0 | 710 | 17.1 |
| 6 | 282RS | 0 | 7 | 2.2 | 721 | 15.9 |
| 10 | 177 | 0 | 7 | 2.2 | 689 | 16.6 |
| 12 | 282R | 0 | 7 | 2.2 | 693 | 15.1 |

The TS7 Softness Values of the tissue products produced according to the present example demonstrate that inclusion of cotton in a relatively small amount, e.g., less than about 10 percent of the total weight of the sheet, and particularly when introduced as a substitute for softwood in the center layer, improves tactile properties. Samples having cotton in the middle layer of a three layered sheet had lower (better) TS7 Softness Values compared to samples prepared without cotton.

Stiffness Index

The effect of cotton fibers on the stiffness of the resulting web was explored by preparing samples varying the amount and layer to which cotton was added. The effect on the Stiffness Index is summarized in the Table below.

TABLE 6

| Sample | 1 | 2 | 3 | 4 | Control 1 |
|---|---|---|---|---|---|
| Cotton Type | 282RS | 282RS | 282RS | 282RS | — |
| Wt % Cotton Total Sheet | 1.6 | 4.8 | 16 | 6.6 | 0 |
| Wt % Cotton Center Layer | 5 | 15 | 50 | 0 | 0 |
| Wt % Cotton Outer Layer | 0 | 0 | 0 | 15 | 0 |
| MD Slope | 8.003 | 6.788 | 6.757 | 7.168 | 6.8 |
| CD Slope | 13.847 | 11.865 | 8.998 | 9.415 | 12.456 |

TABLE 6-continued

| Sample | 1 | 2 | 3 | 4 | Control 1 |
|---|---|---|---|---|---|
| GMT | 700 | 656 | 590 | 503 | 653 |
| Stiffness Index | 15.03 | 13.68 | 13.21 | 16.34 | 14.09 |
| Stiffness Index Delta | 0.94 | −0.41 | −0.88 | 2.24 | — |

Codes prepared with about 15 percent cotton by weight of the center layer (about 4.8 percent of the total weight of the sheet) provided reduced Stiffness Index compared to controls containing no cotton, at equivalent strengths. Codes with comprising about 50 percent cotton by weight of the center layer also produced a less stiff sheet, however, the sheet also had a substantially lower GMT and machine runability was poor. As can be further seen in Table 5, when cotton is incorporated into the outer layer of the sheet an increase in the Stiffness Index is observed.

Fine Crepe Structure

Samples, prepared as described above were also evaluated for Fine Crepe Structure. The results are summarized in Table 7 below. The Fine Crepe Structure values of the tissue products produced according to the present example also demonstrate that inclusion of cotton in a relatively small amount, e.g., less than about 10 percent of the total weight of the sheet, and particularly when introduced as a substitute for softwood in the center layer, improves tactile properties. Samples having cotton in the middle layer of a three layered sheet had lower (better) Fine Crepe Structure compared to samples prepared without cotton as well as sample having cotton in the outer layer of the sheet.

TABLE 7

| Sample | Cotton Type | Wt % Cotton Outer Layer | Wt % Cotton Center Layer | Wt % Cotton Total Sheet | Fine Crepe Structure (% COV @ 0.28-0.55 mm) |
|---|---|---|---|---|---|
| 1 | 282RS | 0 | 5 | 1.6 | 19.68 |
| 2 | 282RS | 0 | 15 | 4.8 | 19.85 |
| Control 3 T3-1 | — | 0 | 0 | 0 | 22.28 |
| T3-6 | 282RS | 0 | 7 | 2.2 | 17.08 |
| T3-10 | 177 | 0 | 7 | 2.2 | 19.58 |
| T3-12 | 282R | 0 | 7 | 2.2 | 19.58 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

We claim:

1. A multi-layered tissue web comprising a first fibrous layer and a second fibrous layer, wherein the first fibrous layer comprises wood fibers and the second fibrous layer comprises wood and cotton fibers, wherein the amount of cotton fibers is from about 1 to about 20 percent, by weight of the second layer.

2. The multi-layered tissue web of claim 1 wherein the total amount of cotton fibers present within the web is from about 1 to about 10 percent by weight of the web.

3. The multi-layered tissue web 1 wherein the cotton fibers have an average fiber length from about 1 to about 3 mm.

4. The multi-layered tissue web of claim 1 wherein the cotton fibers have an average fiber length less than about 2 mm.

5. The multi-layered tissue web of claim 1 wherein the cotton fibers have a curl index of greater than about 0.15.

6. The multi-layered tissue web of claim 1 wherein the cotton fibers comprise from about 5 to about 15 percent by weight of the second layer.

7. The multi-layered tissue web of claim 1 wherein the first fibrous layer is positioned adjacent to the second fibrous layer.

8. The multi-layered tissue web of claim 1 wherein the first fibrous layer comprises softwood fibers, hardwood fibers, or a combination thereof.

9. The multi-layered tissue web of claim 1 further comprising a third fibrous layer, the third layer comprising softwood fibers, hardwood fibers, or a combination thereof.

10. The multi-layered tissue web of claim 9 wherein the first and third layers are substantially free of cotton fibers.

11. The multi-layered tissue web of claim 1 wherein the tissue web has a basis weight less than about 80 grams per square meter.

12. The multi-layered tissue web of claim 1 wherein the web comprises a creped, through-air dried tissue web.

13. The multi-layered tissue web of claim 1 having a Fine Crepe Structure of less than about 20% COV @ 0.28-0.55 mm.

14. The multi-layered tissue web of claim 1 having a Stiffness Index of less than about 9.25.

15. The multi-layered tissue web of claim 1 having a TS7 Softness Value of less than about 9.5 dB V^2 rms.

16. A through-air dried tissue web comprising a first fibrous layer consisting essentially of hardwood fibers and a second fibrous layer comprising cotton fibers, wherein the amount of cotton fibers in the second fibrous layers comprises from about 1 to about 15 percent by weight of the second layer.

17. The through-air dried tissue web of claim 16 further comprising a third fibrous layer, the third layer comprising softwood fibers, hardwood fibers, or a combination thereof.

18. A multi-ply tissue product comprising at least a first and a second ply, wherein at least one of the plies comprises a first and a second layer, wherein the first layer comprises wood fibers and the second fibrous layer comprises cotton fibers, wherein the amount of cotton fibers is from about 1 to about 20 percent by weight of the second layer.

19. The multi-ply tissue product of claim 18 wherein the first layer of the first ply is substantially free of cotton fibers.

20. The multi-ply tissue product of claim 18 wherein the plies are arranged such that the layer comprising cotton fibers is not brought into contact with the user's skin in-use.

* * * * *